July 30, 1929.  A. F. KLASING  1,722,667
HAND BRAKE OPERATING MEANS
Original Filed Nov. 23, 1925    3 Sheets-Sheet 1
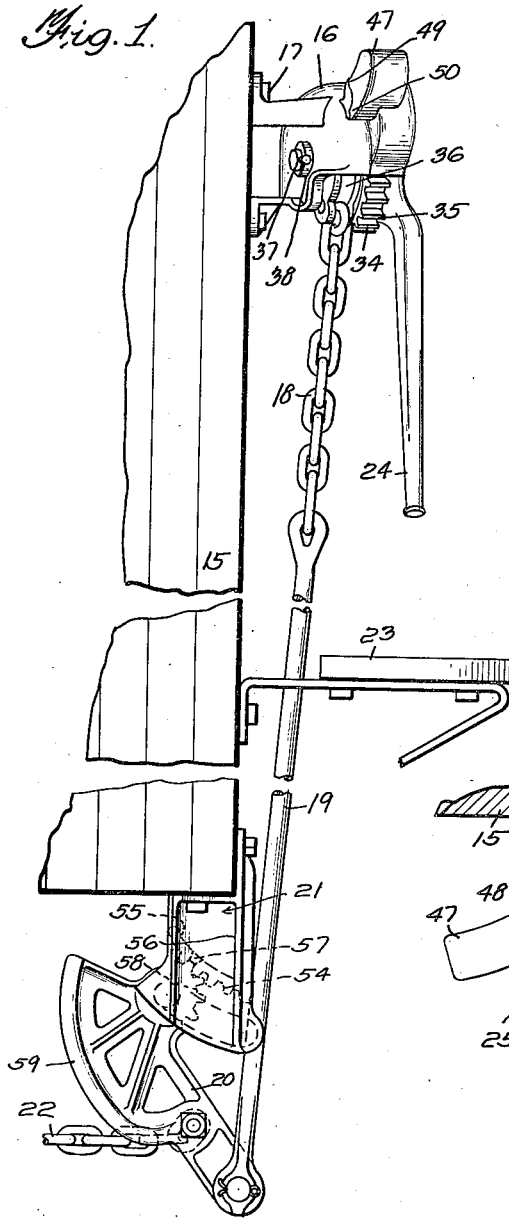
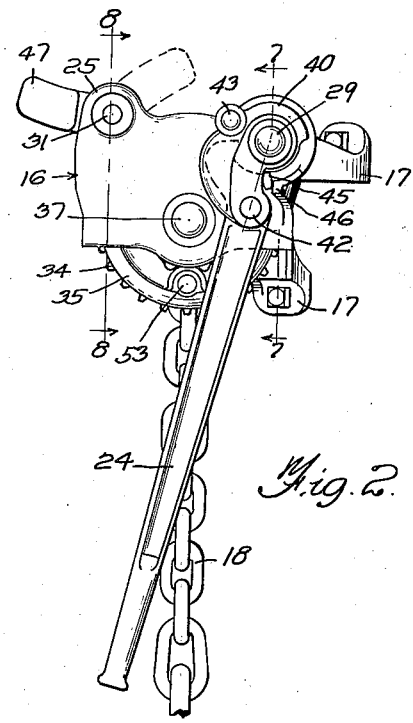
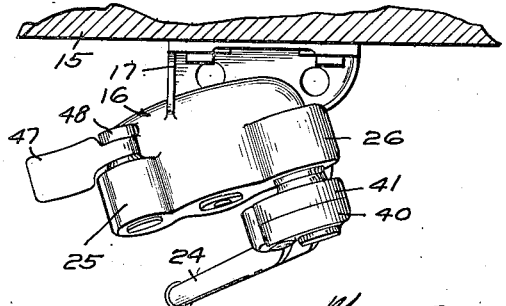
Inventor
Augustus F. Klasing,
By Jerry A. Mathews
Attorney

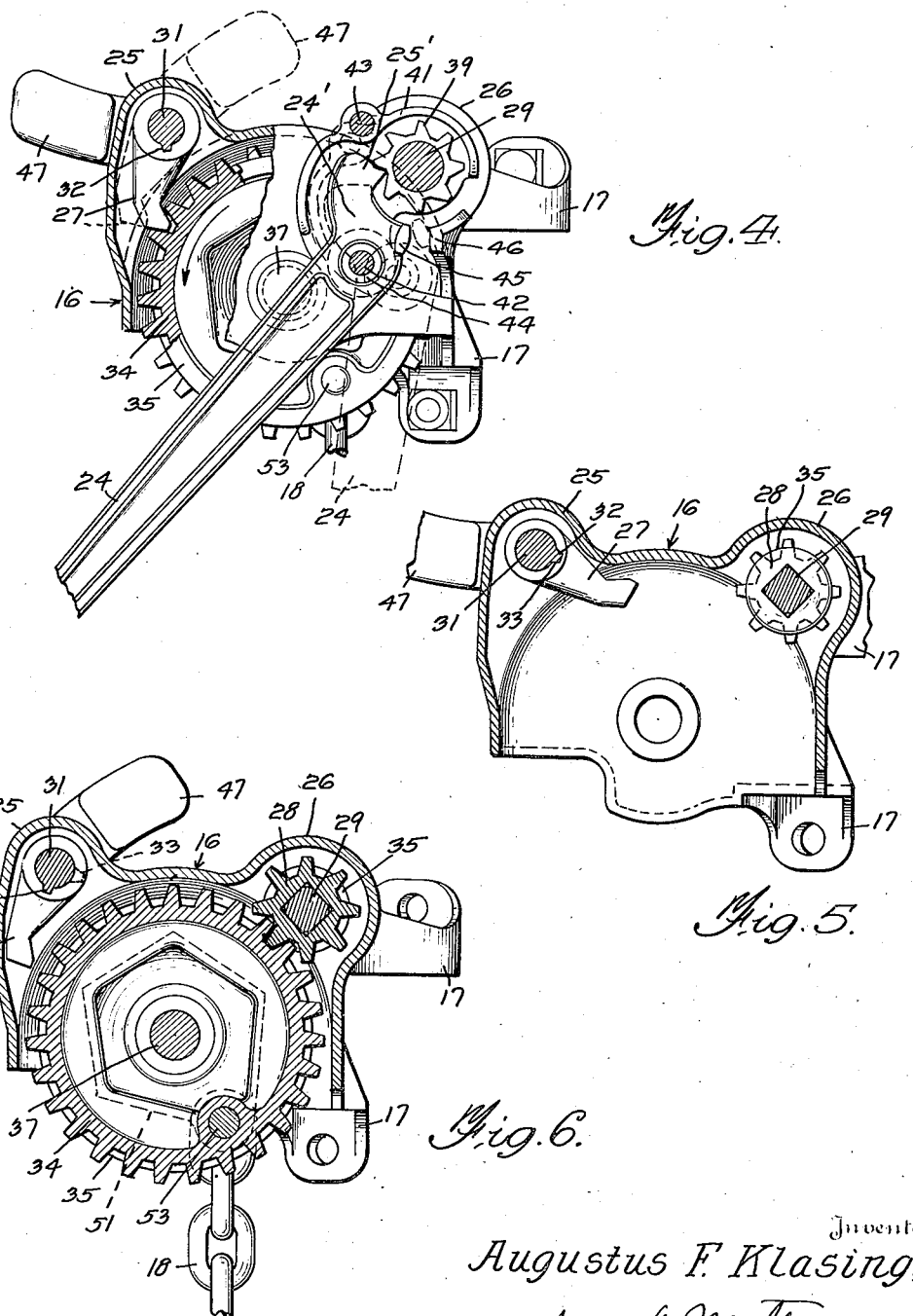

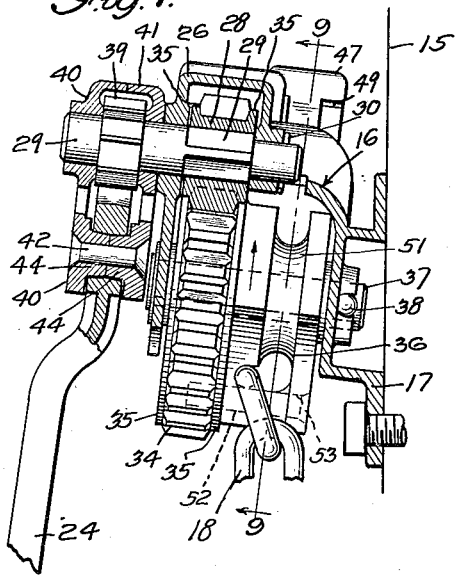
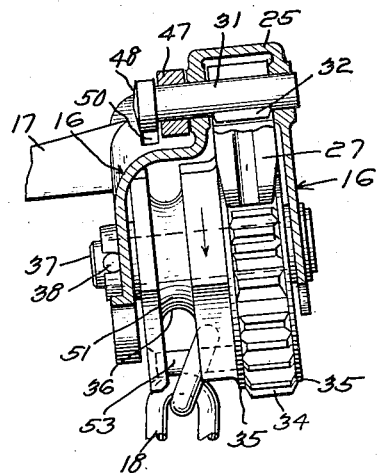
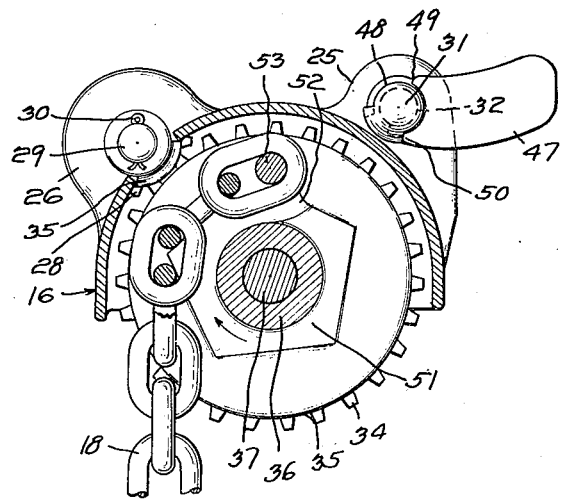
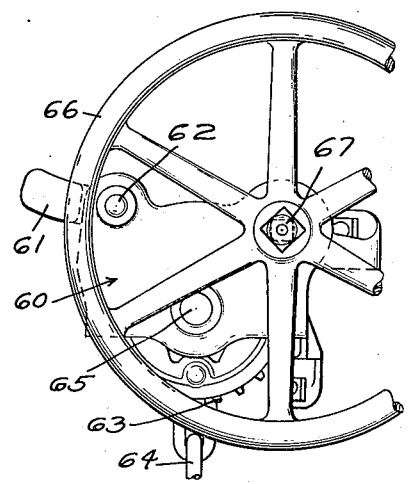

Patented July 30, 1929.

UNITED STATES PATENT OFFICE.

AUGUSTUS F. KLASING, OF CHICAGO, ILLINOIS.

HAND-BRAKE-OPERATING MEANS.

Original application filed November 23, 1925, Serial No. 70,757. Divided and this application filed May 2, 1927. Serial No. 188,250.

My invention relates to hand brake operating means of the type adapted by an upward pull on an operating part located at the end of a car to apply power to the operating parts movable longitudinally of the car for applying the brake shoes to the wheels.

This application is a division of my copending application for hand brake operating means, filed November 23, 1925, Serial No. 70,757.

It is the principal object of my invention to provide a new and improved form and arrangement of parts constituting the operating means at the end of the car whereby the requisite power may be obtained for tightening the shoes against the wheels at the end of the brake applying operation whether there is a very great amount or a very small amount of play in the connections, whereby there shall be a comparatively quick take-up of the play at the start of the operation, whereby the power means can be used to advantage for varying the speed of the car as may be desired by a more or less complete tightening of the brakes against the wheels in a gravity switch yard, and whereby the power means can be used to apply great power and then release quickly and readily without danger of injury to the operator. It is another object of my invention to provide a construction which can be produced readily and with comparatively low cost of manufacture by reason of the use of a small number of parts of simple arrangement which can be assembled quickly and easily and as easily taken down for substitution of new parts in case of necessity.

It is another object of my invention to improve devices of this type in sundry details hereinafter pointed out. The preferred means by which I have accomplished my several objects are illustrated in the drawings and are hereinafter specifically described. That which I believe to be new and desire to cover by Letters Patent is set forth in the claims.

In the drawings,—

Fig. 1 is a fragmentary view of one end of a box car from one side thereof showing my improved braking apparatus in position thereon, the parts being partly broken away for clearness of illustration;

Fig. 2 is a view of the parts at the top portion of the car as seen from the right in Fig. 1;

Fig. 3 is a top plan view of the parts shown in Fig. 1;

Fig. 4 is a view similar to Fig. 2 but with certain of the parts broken away for better showing the construction;

Fig. 5 is a view from substantially the same point as that of Fig. 4 but showing the position of certain parts in the course of assembly of the apparatus before the operating lever and drum have been placed into position;

Fig. 6 is a view similar to Fig. 5 but showing the winding drum in position;

Figs. 7 and 8 are vertical cross-sectional views taken substantially on lines 7—7 and 8—8 respectively of Fig. 2;

Fig. 9 is a vertical cross-sectional view taken substantially at line 9—9 of Fig. 7, but with certain parts in changed position; and Fig. 10 is a view similar to Fig. 2 but showing a modified form of construction.

Referring now to Figs. 1 to 9, in which corresponding parts are indicated by the same reference characters,—15 indicates the body of a box car having mounted upon the end near the upper edge thereof a frame in the form of a housing 16 held in position by legs or brackets 17. Within the housing 16 is mounted the operating mechanism by which an upward pull is exerted upon a cable, which is shown in the form of a chain 18, and a link 19 pivotally connected at the bottom of the car body with an arm 20 which is swingingly mounted upon a bracket 21, the arm 20 having connected thereto a cable in the form of a chain 22 for applying power to any suitable type of brake underneath the car body. A platform 23 is secured upon the end of the car body in suitable position for supporting a trainman for manipulating the operating mechanism within the housing 16 through the medium of a lever 24. This lever 24 is provided near its pivot with a laterally extending arm or crank 24', carrying a dog or tooth 25'.

As is clearly shown in Fig. 5, the housing 16 is provided at its upper end portion with two upward extensions 25 and 26, within one of which there is mounted a pawl 27 and within the other of which is mounted a pinion 28. The pinion 28 is provided with a square opening therethrough for receiving a square shaft 29 which is inserted through suitable openings in the walls forming the faces of the housing 16 and the extension 26, such shaft 29 being inserted freely into position from the left in Fig. 7 when the pinion 28 has been placed in position for receiving the shaft, such shaft being held in position by means of a pin 30 through an opening in the end of the shaft as is shown in said Fig. 7. The pawl 27 is held in position by means of a heavy pin 31 supported by suitable bearings in the side faces of the extension 25 (see Fig. 8), the pin 31 being provided with a lug 32 which engages a groove in the pawl 27 so as to hold the pawl from swinging with respect to said pin 31. As is best shown in Fig. 6, one of the bearings for the pin 31 is provided with a groove 33 adapted to receive the lug 32 for permitting the insertion of the pin only when the pin and pawl are swung upwardly out of their normal position into the position shown in Fig. 5. After the pin 31 has been inserted to operative position, the pawl 27 is swung downwardly into operative position as shown in Fig. 6, whereupon the lug 32 prevents the withdrawal of the pin 31.

With the pinion 28 and the pawl 27 in position as shown in Fig. 6, a gear 34 is adapted to be inserted into position within the housing from below, being adapted to mesh with the pinion 28, the pawl 27 being adapted in the operative position of the gear 34 to stand either in operative engagement with the gear as shown in Fig. 4 or to stand out of engagement with the gear as shown in solid lines in Fig. 6. The gear 34 and pinion 28 are preferably provided with shrouds 35 at their opposite faces for strengthening the teeth, the shroud of the gear being adapted to stand in contact with the shroud of the pinion, preferably, for rendering the action of the gearing smooth and easy.

As is clearly shown in Fig. 7, the gear 34 is provided with a drum 36, such drum in the construction shown being formed integrally with the gear. The gear and drum are mounted revolubly in position within the housing 16 by means of a heavy pin 37 which is held from removal by means of a cotter pin 38, as is clearly shown in Figs. 7 and 8.

The means for rotating the gear 34 and drum 36 through the pinion 28 and shaft 29 comprises a ratchet wheel 39 which in the construction shown is formed integrally with the shaft 29. This ratchet wheel is arranged to be engaged by the dog or tooth 25'. As is best shown in Fig. 7, the ratchet wheel 39 is enclosed within a two-part housing comprising members 40 and 41 which are revolubly mounted upon the shaft on opposite sides of the ratchet wheel being held together about the ratchet wheel by means of rivets 42 and 43, as is best shown in Fig. 4.

As is shown in Fig. 7, each of the members 40 and 41 is provided with a boss 44 on its inner face about the rivet 42, the lever 24 above referred to being mounted upon such bosses 44. The lever 24 extends upwardly beyond the rivet 42 into position to engage the teeth of the ratchet wheel 39, as is shown in Fig. 4 in solid lines, the lever 24 being adapted to swing about the rivet 42 into the position shown in dotted lines for freeing the lever from engagement with the ratchet wheel.

As is best shown in said Fig. 4, the lever 24 is provided with a lug 45 extending across the face of the lever parallel with the axis about which the lever is rotatable, such lug 45 being located above the axis of the lever so that when the lug 45 comes in contact with a lug 46 carried by the housing 16, the lever 24 is swung toward the right in said Fig. 4 for freeing the lever from the ratchet wheel, this action taking place at the end of the swinging movement of the lever 24 and housing 40 and 41 about the axis of the shaft 29.

For holding the pawl 27 alternatively in either its operative position or its inoperative position, I have provided a weighted arm 47 which is pivotally mounted upon the pin 31 outside of the housing 16 and the extension 25. At its outer end, the pin 31 is provided with a head 48 in the form of a segment, the weight arm 47 being provided with shoulders 49 and 50 which are adapted alternatively to engage the ends of the segment portion of the head for holding the bolt 31 either in the position as shown in solid lines in Fig. 4 with the pawl 27 engaging the gear 34, or for holding the pin and pawl in the position shown in said Fig. 6 in solid lines, the alternative position of the arm 47 being such at the opposite sides of the pin 31 that the pawl 27 is held in its one position or the other by gravity acting upon the arm 47.

As is best shown in Figs. 7 and 8, the drum 36 is provided with a peripheral groove 51 extending about the drum, the peripheral face of the drum being made in the form of angularly disposed portions of such a length as to cooperate with the chain 18 which is connected to the drum so as to be wound thereabout. As is best shown in Fig. 9, each alternate link of the chain 18 at its upper end portion is adapted to lie edgewise within the groove 51, while each other alternate link lies flat upon one of the angularly disposed faces of the drum. As is best shown in Fig. 7, the groove 51 is provided with a slightly offset portion 52 at the point where the chain 18 is attached thereto, so that the end link of the chain may lie in diagonal position with respect to the central plane of the drum so as to permit a greater length of chain to be wound about the face of the drum without interference of the links with each other. As is clearly shown in said Fig. 7, the said end link is connected with the drum by means of a rivet 53 secured in position across the peripheral groove 51. As is also best shown in Fig. 9, the face of the drum with which the second link of the chain comes into contact at the start of the rotation of the drum is located slightly farther away from the axis about which the drum is revoluble than are the remaining faces of the drum, whereby a quick take-up of the slack in the brake connections is effected.

The bracket 21 at the bottom of the car body, through the medium of which the arm 20 is mounted in position, comprises a diagonally disposed rack bar 54 which is mounted between the side faces 55 of the bracket, the faces 55 and the bar 54 being formed integrally in the construction shown by casting, the outer faces of the walls 55 being provided with strengthening ribs 56. Between the walls 55, I have provided a grease chamber adapted to contain a supply of heavy grease which is adapted to have access to the face of the rack bar through an opening 57 at the lower end of the chamber whereby the rack bar and its cooperating parts are kept lubricated. The arm 20 is provided with teeth 58 meshing with the rack bar 54, the arm 20 being mounted in position so that as the arm is swung in counter-clockwise direction in Fig. 1 through the medium of the link 19, the arm as a whole is moved downwardly by the engagement of the teeth 58 with the rack bar 54. The arm 20 is also provided with a drum portion 59 about which the chain 22 is wound as the power is applied to the arm through the operating mechanism.

When it is desired to set the brakes on the car, the weight 47 will be thrown into the position shown in solid lines in Fig. 4 for holding the pawl 27 in contact with the gear 34. In this position, the pawl is adapted to prevent rotation of the drum in clockwise direction in said Fig. 4 but is adapted to permit rotation of counter-clockwise direction, the pawl 27 being adapted to yield against the force of gravity acting upon the weight 47.

When the operator grasps the lever 24 and starts to move it toward the left in said Fig. 4, the weight of the lever at the upper end thereof causes the lever to swing with respect to the housing 40 and 41 so as to bring the lever into engagement with the ratchet wheel 39. After such engagement, the continued upward movement of the lever 34 serves to rotate the ratchet wheel 39, the shaft 29 and the pinion 28 in clockwise direction in Fig. 4, causing the gear 34 to rotate in counter-clockwise direction in said figure for winding the chain 18 about the drum 36. As will be readily understood, the pawl 27 automatically holds the gear and drum from reverse rotation when the pressure upon the lever 24 is discontinued. If the power applied to the chain 18 is insufficient at the end of a single upward stroke of the lever 24, the lever is again moved downwardly to approximately its lowermost position and is then given a second operative stroke serving to rotate the gear and drum additionally for tightening the brakes.

When it is desired to place a car in position by the gravity switching system, the weight 47 can be placed in the position shown in solid lines in Fig. 4 so as to give the lever 24 the requisite number of strokes for taking up the slack of the brake connections and applying the desired force upon the brakes for controlling the car. The weight 47 can then be shifted to the position shown in dotted lines in said figure, whereupon the car is completely under the control of the trainman through the use of the lever 24 alone, the operator being adapted to apply any desired degree of pressure upon the brake for slowing up the movement of the car at a crossing, being able very readily and quickly to release the pressure to the desired extent by a downward movement of the lever when it is desired that the car be permitted to run more rapidly. When it is desired to stop the car in position where it is necessary to hold the car in position by the use of the brakes, the arm 47 would be thrown again to the position at the left in Fig. 4 and the brakes would be tightened to the desired extent.

When it is desired to release the brakes completely and quickly, this can be accomplished by throwing the arm 47 to the position shown in dotted line in said Fig. 4 and applying upward pressure on the lever 24 for relieving the pressure upon the pawl 27. As soon as the pressure is relieved from the pawl, the weight 47 serves to swing the pawl to inoperative position, whereupon the operator may release the lever 24 which drops into the position shown in dotted lines in said figure, the contact of the lug 45 with the lug 46 at the end of such downward movement serving to swing the lever with respect to the arm formed by the housing members 40 and 41 for carrying it out of contact with the ratchet wheel 39 as above described for completely releasing the gear and drum from the holding means.

If it is preferred, the brakes can be released by successive up and down movements of the lever 24 without the throw-out action of the lugs 45 and 46. For this method of releasing the brakes, the lever 24 is moved to substantially its uppermost position before the lever is thrown into engagement with the ratchet wheel 39, the operator being able to manipulate the lever for effecting this result when desired. Upward pressure would then be applied upon the lever for releasing the pawl 27 from the gear, the arm 47 having been previously moved toward the right in said Fig. 4 for effecting this result. As soon as the pawl 27 is thus released, the operator moves the lever 24 downwardly, and at the end of the downward stroke throws the pawl 27 into operative position by shifting the arm 47 toward the left for holding the ratchet from rotation until the lever can again be brought into operative engagement at the upper portion of its stroke. By a succession of such movements of the lever and pawl, the brakes would be released gradually and easily.

In Fig. 10 which shows a modified form of construction, a housing 60 is provided corresponding to the housing 16 of the construction first described. In this construction a weighted arm 61 is provided for rotating a shaft 62 corresponding to the shaft 29 of the other construction. There is a gear 63 comprising a drum to which a chain 64 is connected for swinging the arm 20 at the bottom of the car, the gear 63 being mounted upon a pin 65 corresponding to the pin 37. In lieu of the lever 24 operating upon the ratchet wheel 39, I have provided a hand wheel 66 which is fixed upon the square end of a shaft 67, the shaft 67 being connected with the gear 63 by means of a pinion (not shown) corresponding with the pinion 28. In operation, the shaft 67 is rotated by power applied directly to the hand wheel 66 instead of through the lever 24 and its cooperating parts, the operation of the device as a whole being otherwise similar to that above described in connection with the construction shown in Figs. 1 to 9.

By my invention I have provided a very simple construction which is capable of applying very great power to the brakes of a car, the arrangement being such that very complete control of the brakes may be had at all times. The construction is so simple and the parts are so few in number and so capable of being reinforced and strengthened that the structure is adapted to last indefinitely without danger of breakage under any normal conditions. The arrangement is such that if by continued use a part becomes worn or weakened, it can very quickly and very easily be removed and replaced with a new part without dismantling the structure as a whole.

While I prefer to employ the construction as shown in my drawings and as above described, it will be understood that I do not wish to be limited to the use of the construction as shown except as the same may be hereinafter specifically claimed, inasmuch as it is evident that changes may well be made in the construction without departing from the spirit of my invention.

Having thus described my invention, I claim:

1. In a hand brake operating means, the combination of a housing, a pawl, a pin for mounting said pawl pivotally in position in said housing, means on said pin serving to prevent insertion or removal of the pin when the pawl is in normal position but adapted to permit the pin to enter when the pawl is standing in changed angular position, a toothed member adapted to be inserted in said housing and revolubly secured therein when the pawl has been swung to normal position, means for rotating said toothed member, and means for holding said pawl yieldingly in engagement with the teeth of said toothed member.

2. In a hand brake operating means, the combination of a housing, a pawl, a pin for mounting said pawl pivotally in position in said housing, means on said pin serving to prevent insertion or removal of the pin when the pawl is in normal position but adapted to permit the pin to enter when the pawl is standing in changed angular position, a toothed member adapted to be inserted in said housing and revolubly secured therein when the pawl has been swung to normal position, said toothed member when in position serving to prevent the pawl from swinging into position for removal of the pin, means for rotating said toothed member, and means for holding said pawl yieldingly in engagement with the teeth of said toothed member.

3. In a hand brake operating means, the combination of a housing having oppositely disposed spaced walls, a pawl, a pin supported in bearings on said housing for pivotally mounting said pawl in position in the housing, a lug on said pin adapted to enter the bearings and to pass through the opening in the pawl only when the pawl is swung out of normal inclined position in the housing, said lug being adapted when the pawl is swung back to normal position to prevent withdrawal of the pin, a toothed member adapted to be inserted in said housing and revolubly secured therein when the pawl has been swung to normal position, means for rotating said toothed member, and means for holding said pawl yieldingly in engagement with the teeth of said toothed member.

4. In a hand brake operating means, the combination of a housing, a pawl, a pin for mounting said pawl pivotally in position in said housing, means on said pin serving to prevent insertion or removal of the pin when the pawl is in normal position but adapted to permit the pin to enter when the pawl is standing in changed angular position, a toothed member adapted to be inserted in said housing and revolubly secured therein when the pawl has been swung to normal position, means for applying power for setting a brake, and yielding means serving alternatively for holding said pawl either in or out of engagement with the teeth of said toothed member.

5. In a hand brake operating means, the combination of a housing, a pawl, a pin for mounting said pawl pivotally in position in said housing, means on said pin serving to prevent insertion or removal of the pin when the pawl is in normal position but adapted to permit the pin to enter when the pawl is standing in changed angular position, a toothed member adapted to be inserted in said housing and revolubly secured therein when the pawl has been swung to normal position, means for rotating said toothed member, means actuated by the rotation of the toothed member for applying power for setting a brake, a weighted arm mounted on said pin before the pin is secured in position in the housing and held by the pin in position at one side of the housing, and lugs on said pin and said weighted arm adapted to support the arm alternatively at opposite sides of the axis of the pin whereby the weight of the arm is utilized for swinging the pawl in either direction either into or out of engagement with said toothed member.

6. In a hand brake operating means, a support, a toothed wheel mounted upon the support, a pawl for engaging said toothed wheel, and a pivotal lock between said pawl and the support for preventing dismounting the pawl when the toothed wheel is mounted upon said support and permitting of said dismounting when the toothed wheel is removed from said support.

7. In a hand brake operating means, a support, a toothed wheel mounted upon the support, a pawl for engaging said toothed wheel, and a pivotal lock between said pawl and the support embodying a slot and lug, the slot and lug being co-related for preventing dismounting the pawl when the toothed wheel is mounted upon said support and permitting of said dismounting when the toothed wheel is removed from said support.

In testimony whereof I affix my signature.

AUGUSTUS F. KLASING.